(12) United States Patent
Yamamoto et al.

(10) Patent No.: US 7,677,771 B2
(45) Date of Patent: Mar. 16, 2010

(54) VEHICLE INSTRUMENT PANEL DEVICE

(75) Inventors: Takao Yamamoto, Saitama (JP);
Katsumasa Ieda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 11/802,711

(22) Filed: May 24, 2007

(65) Prior Publication Data

US 2007/0272462 A1 Nov. 29, 2007

(30) Foreign Application Priority Data

May 29, 2006 (JP) .............................. 2006-148142

(51) Int. Cl.
*F21V 33/00* (2006.01)
*B62J 6/00* (2006.01)
*B62D 25/14* (2006.01)

(52) U.S. Cl. .................. 362/474; 362/43; 362/489; 180/90; 280/288.4; 340/432

(58) Field of Classification Search .............. 362/43, 362/474, 489; 180/90; 280/288.4; 340/432
See application file for complete search history.

(56) References Cited

U.S. PATENT DOCUMENTS 7,473,017 B2 * 1/2009 Yamamoto et al. .......... 362/473

2003/0226494 A1 12/2003 Sunaga et al.

FOREIGN PATENT DOCUMENTS

| EP | 1 391 343 A1 | 2/2004 |
| EP | 1 582 446 A2 | 5/2005 |
| JP | 2005-280577 A | 10/2005 |
| JP | 2006-98092 | 4/2006 |

* cited by examiner

*Primary Examiner*—Stephen F Husar
*Assistant Examiner*—James W Cranson
(74) *Attorney, Agent, or Firm*—Birch, Stewart, Kolasch & Birch, LLP

(57) ABSTRACT

An instrument panel device includes an instrument panel incorporating a speed meter, an odometer, a main switch and a meter cover covering the instrument panel and the main switch. The main switch is provided with a key cylinder projecting inwardly from the side surface of the meter cover. An inclined surface is formed on the side surface of the meter cover so that the projecting direction of the key cylinder is oriented obliquely downwardly. The inclined surface is formed at a position lowered by one step from the outermost circumferential surface of the meter cover. The resulting configuration reduces the size of the instrument panel device by reducing the depth of the instrument panel device incorporating the main switch with the key cylinder.

15 Claims, 6 Drawing Sheets

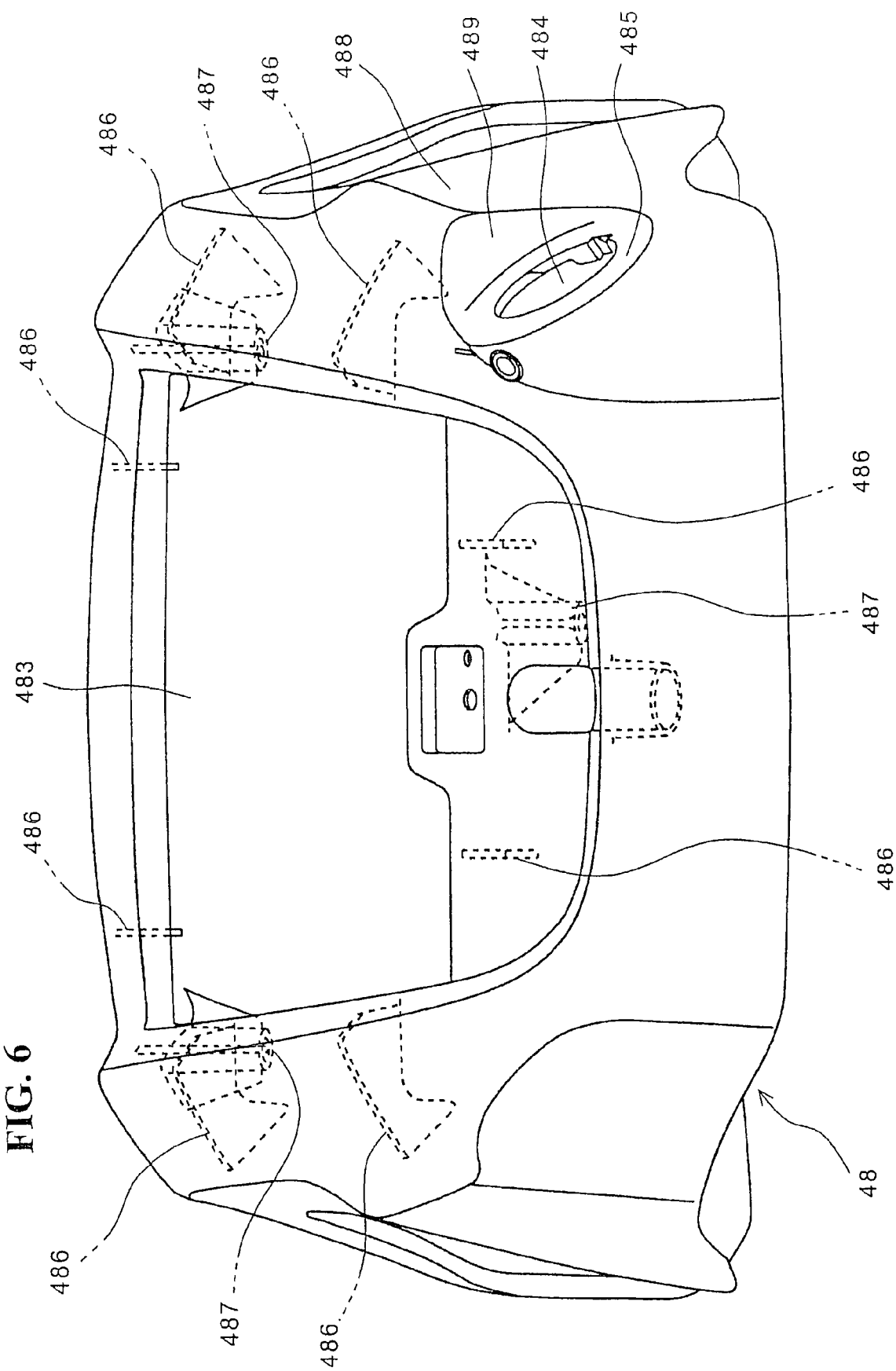

VEHICLE INSTRUMENT PANEL DEVICE

CROSS-REFERENCE TO RELATED APPLICATION

The present application claims priority under 35 U.S.C. §119 to Japanese Patent Application No. 2006-148142, filed May 29, 2006, the entire contents of which are hereby incorporated by reference.

BACKGROUND OF THE INVENTION

1. Field of the Invention

The present invention relates generally to vehicle instrument panel devices and in particular to a vehicle instrument panel device having a main switch including an ignition switch.

2. Description of Background Art

Motorcycles, all terrain vehicles (hereinafter referred to as "ATVs") and other vehicles include an instrument panel device generally housing a speed meter and an odometer. There is known an example in which a main switch including an ignition switch as well as instruments such as a speed meter and an odometer is integrally arranged in such an instrument panel device. Japanese Patent Laid-Open No. 2005-280577 discloses an ATV attached with an instrument panel device including a main switch in which the central axis of a key cylinder, namely, a direction of taking a key in and out, is set to a direction almost-vertically to an instrument panel.

An effort has been made to reduce the thickness of the entire instrument panel device (a size in a direction perpendicular to an instrument panel) by employing a liquid crystal display panel or the like as an instrument panel installed in the instrument panel device.

A key cylinder may be arranged almost vertically to an instrument panel like the instrument panel device described in Japanese Patent Laid-Open No. 2005-280577. In this case, a cover of the instrument panel device needs to cover at least a length of the key cylinder extending from the surface of the instrument panel. However, this opposes the technique of downsizing the instrument panel device by reducing the thickness of the entire instrument panel device. Thus, a technique is desired which can downsize the instrument panel device without the effect of the length of the key cylinder.

It is an object of the present invention to provide an instrument panel device that can be downsized while being equipped with a main switch having a key cylinder.

SUMMARY AND OBJECTS OF THE INVENTION

To achieve the above object, according to a first aspect of the present invention, a vehicle instrument panel device includes: an instrument panel having an instrument and a screen displaying display information of the instrument; a main switch including a key cylinder; and a meter cover which covers the instrument panel and the main switch; the main switch is attached to an side wall portion of the meter cover and the key cylinder projects obliquely downwardly from the side wall portion in the meter cover.

According to a second aspect of the present invention, an inclined surface formed to have a downward angle with respect to an upper surface of the instrument panel is provided in the side wall portion of the meter cover and the inclined surface is provided with an attachment hole adapted to receive the key cylinder passing therethrough.

According to a third aspect of the present invention, the inclined surface is arranged in the side wall portion of the meter cover and at a position close to a rear portion of a vehicle mounted with the vehicle instrument panel device.

According to a fourth aspect of the present invention, the inclined surface is formed with a stepped surface at a position recessed inwardly of the meter cover from an outermost circumferential portion of the side wall portion.

According to a fifth aspect of the present invention the inclined surface is formed to have a further inclined angle so that the key cylinder which passes through the attachment hole for attachment thereto is oriented toward the screen of the instrument panel.

The effects of the invention include the following:

According to the first aspect of the present invention, unlike, for example, the structure of a key cylinder extending vertically from the upper surface of a meter cover, the key cylinder is arranged to extend obliquely downwardly from the side surface of the meter cover. Therefore, the depth extending downward from the upper surface of the meter cover can be reduced. Consequently, the instrument panel device can be entirely downsized. In addition, since the depth of the meter cover is reduced, the position of the instrument panel can be lowered accordingly, contributing to lowering of the gravity center of the entire vehicle.

According to the second aspect of the present invention, since the main switch is attached to the inclined surface formed in the meter cover, the projecting direction of the key cylinder can be defined accurately.

According to the third aspect of the present invention, since the main switch is disposed close to the rear end portion of the meter cover, the operator can operate switches without stretching her or his arm widely. In addition, since the amount of the meter cover projecting from the main switch toward the operator is reduced, the space around the main switch can be enlarged during operation, thereby enhancing operability.

According to the fourth aspect of the present invention, since the inclined surface serving as an attachment surface for the main switch is set at a position recessed by one step, the entire instrument panel device can be further downsized. In addition, the amount of the key projecting from the meter cover can be reduced, the key being inserted into the key cylinder.

According to the fifth aspect of the present invention, since the key cylinder extends toward the screen of the instrument panel, protrusion of the meter cover can be reduced, thereby further downsizing the entire instrument panel device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a front view of the meter cover.

DETAILED DESCRIPTION OF THE PREFERRED EMBODIMENTS

Figure 3:
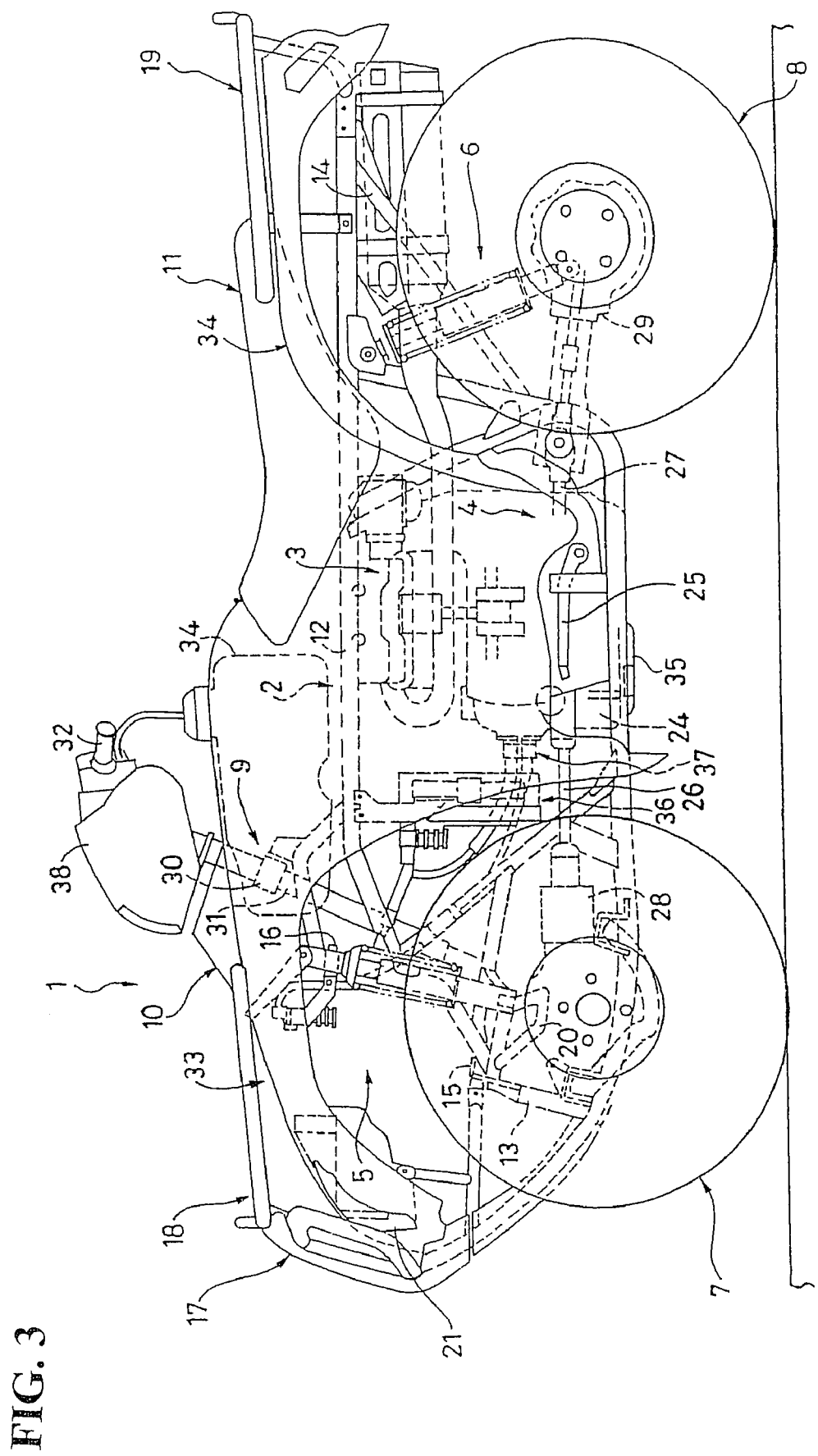
FIG. 3 is a side view of an ATV as an example of the vehicle mounted with the instrument panel device.

An embodiment of the present invention will be hereinafter described with reference to the drawings. FIG. 3 is a side view of an ATV mounted with an instrument panel device according to the embodiment of the present invention. The ATV 1 includes a body frame 2, a 4-cycle engine 3, a power transmission device 4, a front cushion 5 and a rear cushion 6. The engine 3 is disposed at a central lower portion of the body frame 2. The power transmission device 4 is connected to the output shaft of the engine 3. The front and rear cushions 5 and 6 carry the front and rear, respectively, of the power transmission device 4 swingably with respect to the body frame 2.

The body frame 2 includes a main frame 12, a pair of left and right front frames 13 and rear frames 14. The front frames 13 are connected by a bracket 15 and a cross member 16. A front guard 17 and a front carrier 18 are attached to the front portion of the front frame 13. A fender 10 composed of a front cover 33 and a rear cover 34 is attached to the body frame 2. A pair of left and right headlights 21 are attached to the front portion of the vehicle body.

The power transmission device 4 includes a transmission 24, a gear shift pedal 25, a front drive shaft 26 and a rear drive shaft 27. The front drive shaft 26 is connected to a front reduction gear 28 and the rear drive shaft 27 is connected to a rear reduction gear 29. A pair of left and right front wheels 7 and rear wheels 8 (only left-hand front and rear wheels 7 and 8 are illustrated) are attached to the power transmission device 4. A steering device 9 is connected to the front wheels 7. The steering device 9 includes a steering shaft 31 attached to the main frame 12 with a shaft holder 30 and a handlebar 32 attached to the steering shaft 31.

A passenger seat 11 is provided above the engine 3. An oil pan 35 is disposed below the engine 3. A cooling fan 36 which forcibly cools the engine and a lubricating oil mechanism 37 are disposed forward of the engine 3. An instrument panel device 38 is provided on the upper portion of the steering device 9.

Figure 1:
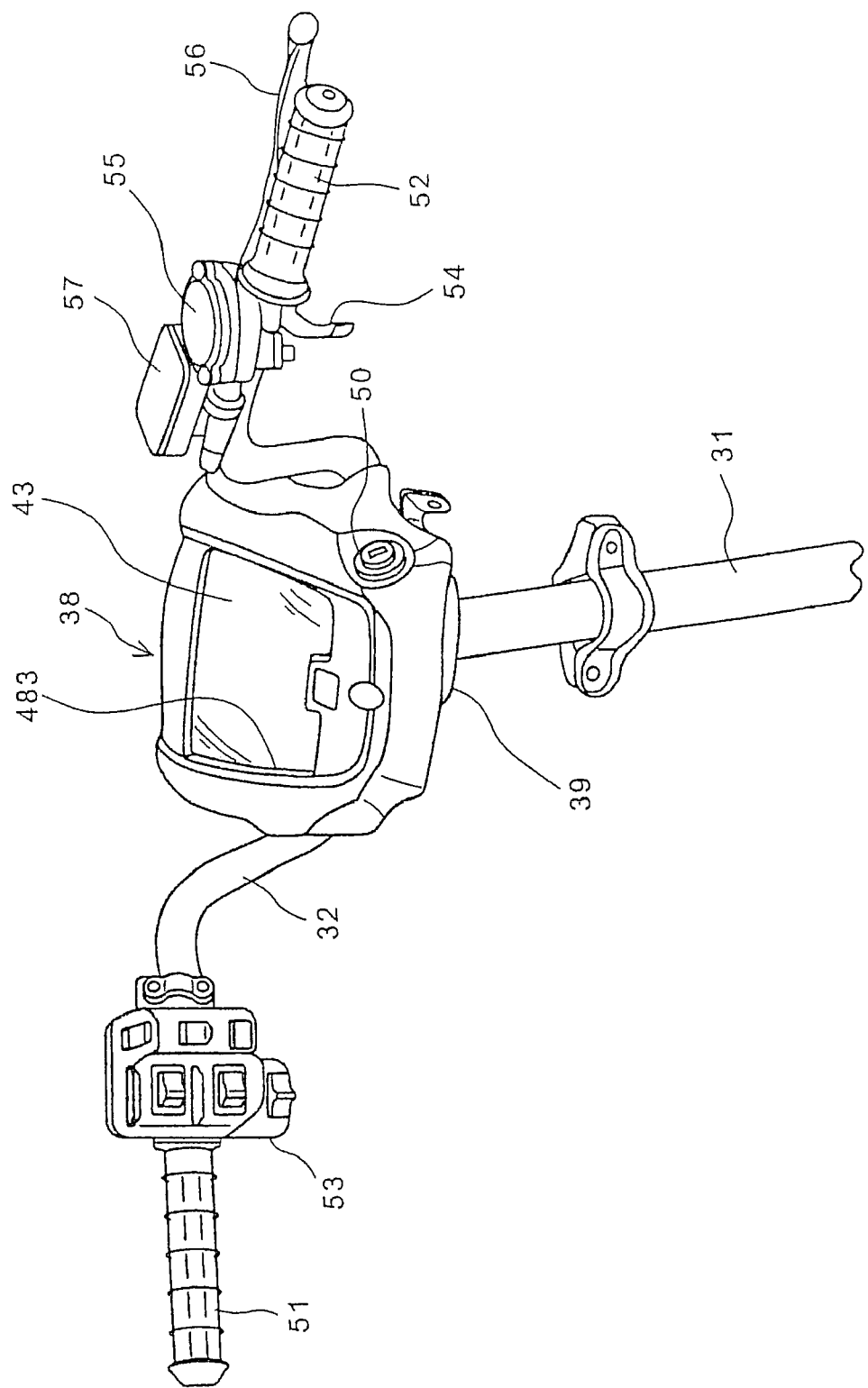
FIG. 1 is a perspective view of an essential portion of a vehicle front portion including an instrument panel device according to an embodiment of the present invention.
Figure 2:
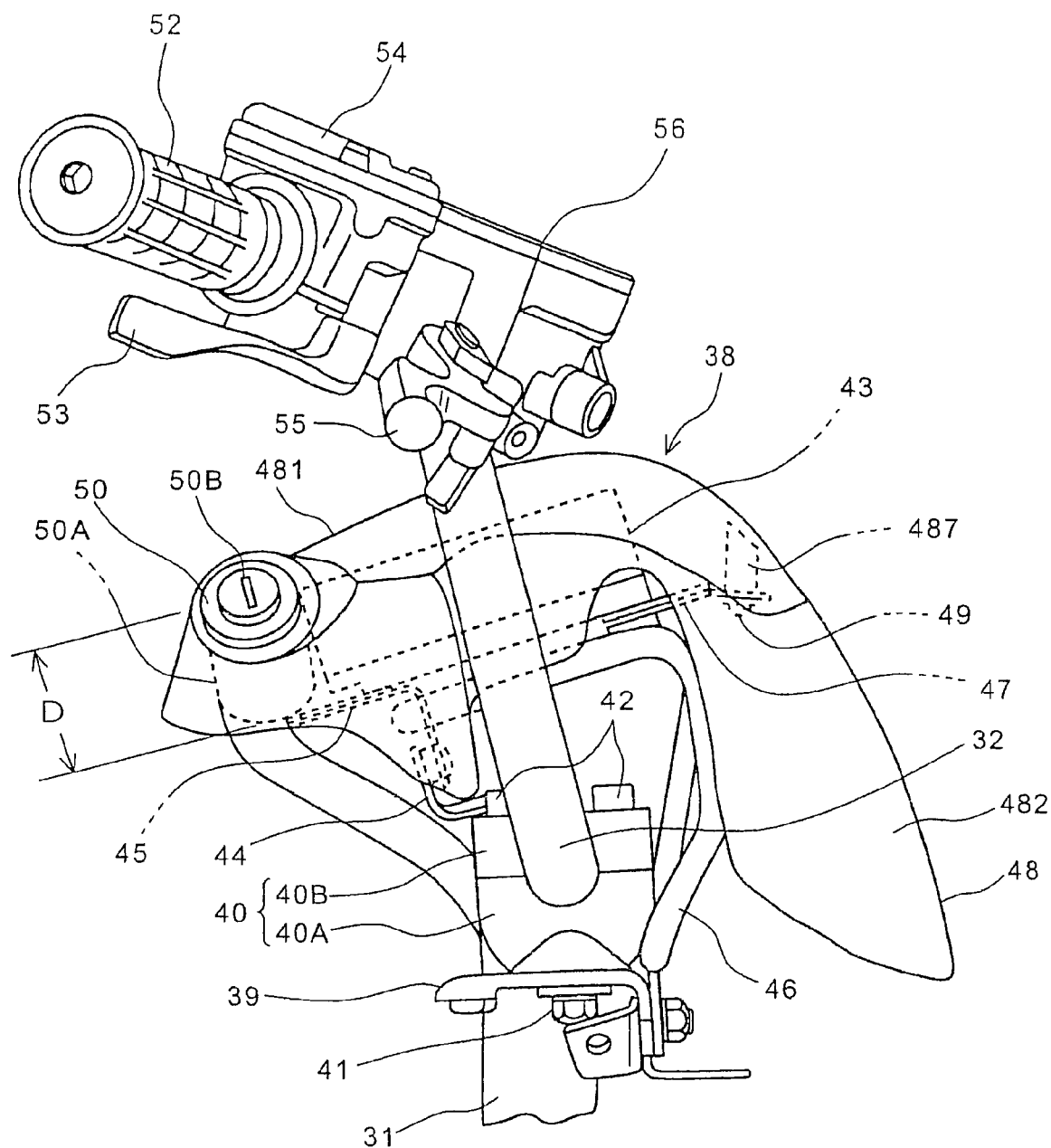
FIG. 2 is a side view of the essential portion of the vehicle front portion shown in FIG. 1.

The instrument panel device 38 is described in detail. FIGS. 1 and 2 are a perspective view and a right side view, respectively, illustrating an upper portion of the steering device 9 with the front cover 33 removed. A support plate 39 with an almost-horizontal surface is fixedly attached to an upper end of the steering shaft 31. A lower-half block 40A constituting part of a handlebar support block 40 is fastened to the upper surface of the support plate 39 with a bolt 41. An upper-half block 40B is, from above, fitted together with and fastened to the lower-half block 40A with bolts 42. The upper surface of the lower-half block 40A and the lower surface of the upper-half block 40B are each formed with a semi-circular groove conforming to the shape of the handlebar 32.

The handlebar 32 is composed of a central horizontal portion, almost-vertical portions extending upward from both the ends of the central horizontal portion and both-end horizontal portions contiguous to the almost-vertical portions. The central horizontal portion of the handlebar 32 is sandwiched from above and below by the upper-half block 40B and the lower-half block 40A, respectively. The semi-circular grooves come into contact with the outer circumference of the handlebar 32.

The lower-half block 40A and the upper-half block 40B are fastened with the bolts 42, whereby the handlebar 32 is secured to the handlebar support block 40.

The instrument panel device 38 is disposed above the central horizontal portion of the handlebar 32, namely, above a portion lowered by one step from both-end portions of the handlebar 32. The instrument panel device 38 includes an instrument panel (panel main body) 43 provided with instruments indicating the conditions of the ATV, such as a speed meter, a rotating meter, a fuel meter, an odometer, etc. and with a liquid crystal display panel indicating information. The panel main body 43 is supported by a stay 45 connected to a bracket 44 secured to the support block 40 and by a stay 47 connected to a pipe member 46 which is secured to the front surface of the plate 39 and extends upward.

A meter cover 48 is provided to cover the central portion of the handlebar 32 including the panel main body 43. The stay 47 extends so as to reach an attachment boss 487 formed inside the meter cover 48. The meter cover 48 is supported by the handlebar 32 by passing a setscrew 49 through the stay 47 from below and fastening it to the attachment boss 487. Attachment bosses (see FIGS. 5 and 6) are provided at the rear portion of the meter cover 48 and are secured to the extension of the stay 45 with setscrews (not shown).

The meter cover 48 is composed of an upper surface portion 481 covering the panel main body 43 from above and a front surface portion 482 which is contiguous to the front portion of the upper surface portion 481 and extends downward. The upper surface of the panel main body 43 is viewed from a window 483 formed in the upper surface portion 481.

A main switch 50 is attached to a right side portion of the upper surface portion 481 of the meter cover 48. The main switch 50 has a function of opening and closing a main circuit which feeds electric power from a battery to an electrical system provided in the ATV 1 and an ignition switch function of driving an ignition device of the engine.

A key cylinder 50A of the main switch 50 is not arranged parallel or vertically to the upper surface of the panel main body 43. The key cylinder 50 is arranged so that its key insertion slot side end portion 50B and bottom portion are located on the upside and downside, respectively. That is to say, the key cylinder 50A is arranged obliquely relative to the upper surface of the panel main body 43. Since the key cylinder 50 is arranged obliquely relative to the upper surface of the panel main body 43, the depth D of the meter cover 48 (a dimension in a direction perpendicular to the upper surface of the panel main body 43) can be reduced as shown in FIG. 2. If the key cylinder 50A is arranged parallel to the panel main body 43, the depth D can be further reduced. Taking into consideration the height of the operator's eyes when she or he inserts the key into the key cylinder 50A, however, it is advantageous that the key insertion slot of the key cylinder 50A slightly faces the upside. Thus, the key cylinder 50A is oriented obliquely so that the depth D is almost equal to the thickness of the panel main body 43.

The handlebar 32 is provided with grips 51 and 52 at left and right ends thereof, respectively. A combination switch 53 is provided adjacently to the left grip 51. The combination switch 53 includes a plurality of switches including a shift-up switch, a shift-down switch, an engine stop switch, a winker switch and a dimmer switch. A throttle lever 54, a throttle lever operation angle sensor 55, a brake lever 56, a brake oil reservoir 57 and the like are provided in the vicinity of the right grip 52.

Figure 4:
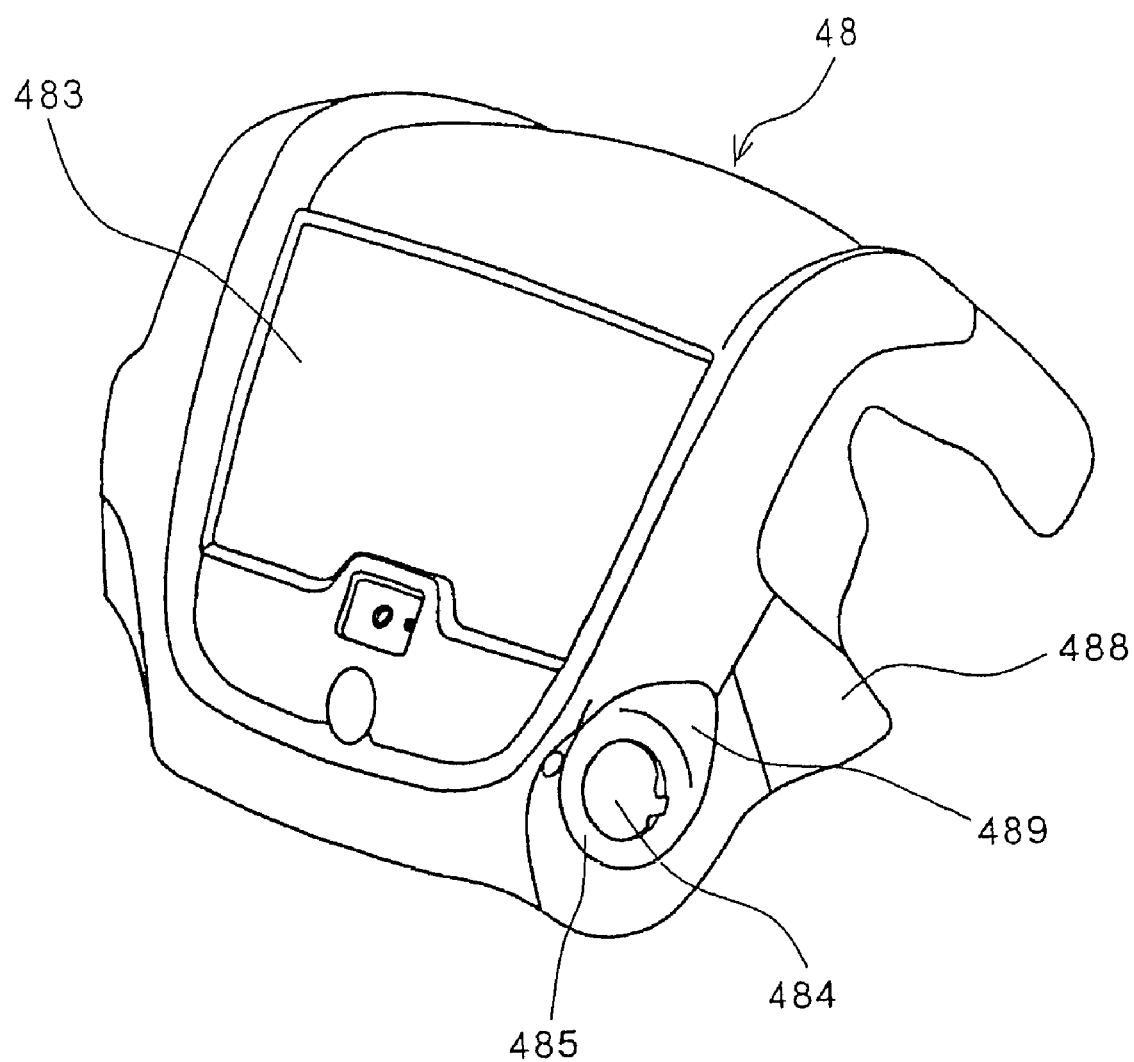
FIG. 4 is a perspective view of a meter cover.
Figure 5:
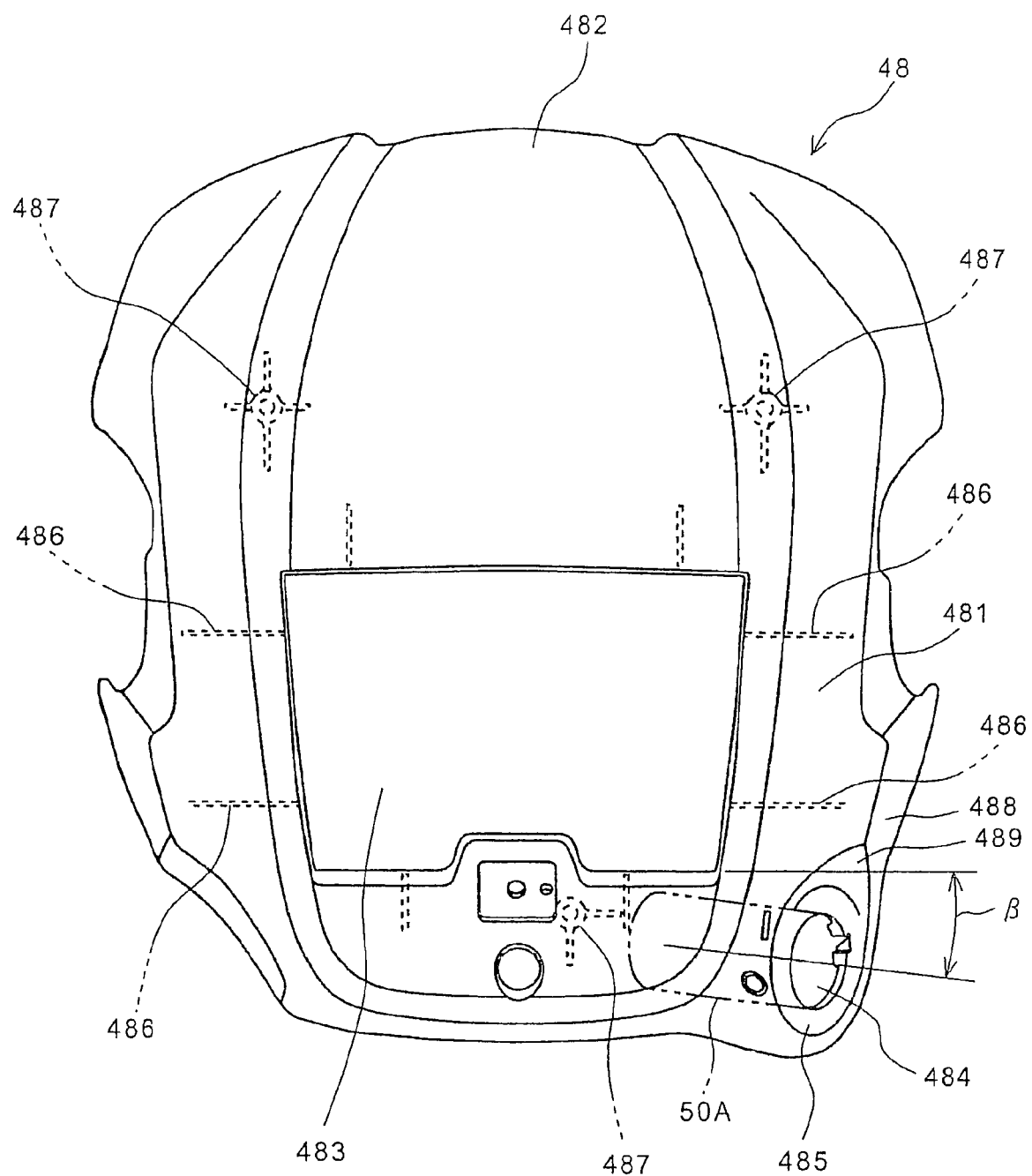
FIG. 5 is a plan view of the meter cover.

The meter cover 48 is subsequently described in detail. FIG. 4 is a perspective view of the meter cover 48, FIG. 5 is a plan view of the meter cover 48 and FIG. 6 is a front view (as viewed from the rear of the vehicle body). The meter cover 48 can be integrally cast from a resin material such as polyethylene. The meter cover 48 is formed with the large rectangular window 483 at the upper surface portion 481 as described above and with a circular hole 484 adapted to receive the key cylinder 50A inserted thereinto. The circular hole 484 is formed in an inclined surface 485 having an angle with respect to a plane including the window 483. The inclined surface 485 has an angle with respect to a plane including the window 483 and is provided along the plane including the window 483 at a minute angle β with respect to the upper and lower sides of the window 483. The inclined surface 485 is formed as a surface recessed from the outermost circumferential portion of the meter cover 48. Specifically, the inclined surface 485 is disposed at a position lowered by one step from the side surface 488 of the meter cover 48 through a boundary surface 489.

In this way, the inclined surface 485 is lowered by one step from the outermost circumferential portion of the meter cover 48. Therefore, a portion of the surface of the key cylinder 50A or a portion of the key 50A inserted into the key cylinder 50A (indicated with the two-dot chain line in FIG. 5) which projects outwardly from the meter cover 48 can be reduced.

Preferably, the position of the key cylinder 50A, namely, the forming position of the circular hole 484 is set at the aftermost portion of the meter cover 48, that is, at a position in vicinity to the end face of the meter cover 48 close to the rear of the vehicle body. This intends to facilitate the operator's operation by bringing the key cylinder 50A closer to the operator.

The meter cover 48 is formed on the inside thereof with a plurality of ribs 486 used for reinforcement and with attachment bosses 487 adapted to receive setscrews 49 fastened thereto for securing the meter cover 48.

The present invention has been described thus far according to the embodiment but is not limited to the embodiment. The invention may be modified or altered in various ways. For instance, the vehicle mounted with the instrument panel device is not limited to the ATV and the present invention can be applied to overall saddle-ride type vehicles such as motorcycles and three wheelers. Such variations are not to be regarded as a departure from the spirit and scope of the invention, and all such modifications as would be obvious to one skilled in the art are intended to be included within the scope of the following claims.

What is claimed is:

1. A vehicle instrument panel device comprising:
an instrument panel having an instrument and a screen displaying display information of the instrument;
a main switch including a key cylinder; and
a meter cover which covers the instrument panel and the main switch;
wherein the main switch is attached to a side wall portion of the meter cover and the key cylinder projects obliquely downwardly from the side wall portion in the meter cover.

2. The vehicle instrument panel device according to claim 1, wherein an inclined surface formed to have a downward angle with respect to an upper surface of the instrument panel is provided in the side wall portion of the meter cover, and the inclined surface is provided with an attachment hole adapted to receive the key cylinder passing therethrough.

3. The vehicle instrument panel device according to claim 2, wherein the inclined surface is arranged in the side wall portion of the meter cover and at a position close to a rear portion of a vehicle mounted with the vehicle instrument panel device.

4. The vehicle instrument panel device according to claim 2, wherein the inclined surface is formed with a stepped surface at a position recessed inwardly of the meter cover from an outermost circumferential portion of the side wall portion.

5. The vehicle instrument panel device according to claim 3, wherein the inclined surface is formed with a stepped surface at a position recessed inwardly of the meter cover from an outermost circumferential portion of the side wall portion.

6. The vehicle instrument panel device according to claim 2, wherein the inclined surface is formed to have a further inclined angle so that the key cylinder which passes through the attachment hole for attachment thereto is oriented toward the screen of the instrument panel.

7. The vehicle instrument panel device according to claim 3, wherein the inclined surface is formed to have a further inclined angle so that the key cylinder which passes through the attachment hole for attachment thereto is oriented toward the screen of the instrument panel.

8. The vehicle instrument panel device according to claim 3, wherein the meter includes at least one attachment boss, the meter cover being supported by a stay mounted on a vehicle handlebar by passing a setscrew through the stay from below and fastening it to the attachment boss.

9. The vehicle instrument panel device according to claim 3, wherein the side wall portion of the meter cover extends further in a lateral direction than does the key cylinder.

10. The vehicle instrument panel device according to claim 3, wherein the main switch is attached to the side wall portion of the meter cover at a position rearward of the instrument panel.

11. A vehicle instrument panel device comprising:
an instrument panel having an instrument and a screen displaying display information of the instrument;
a main switch including a key cylinder; and
a meter cover which covers of the instrument panel and the main switch,
wherein the meter cover also covers a central portion of a vehicle handlebar, and
wherein the main switch is attached to a side wall portion of the meter cover and the key cylinder projects obliquely downwardly from the side wall portion in the meter cover.

12. The vehicle instrument panel device according to claim 11, wherein an inclined surface formed to have a downward angle with respect to an upper surface of the instrument panel is provided in the side wall portion of the meter cover, and the inclined surface is provided with an attachment hole adapted to receive the key cylinder passing therethrough.

13. The vehicle instrument panel device according to claim 12, wherein the inclined surface is arranged in the side wall portion of the meter cover and at a position close to a rear portion of a vehicle mounted with the vehicle instrument panel device.

14. The vehicle instrument panel device according to claim 12, wherein the inclined surface is formed with a stepped surface at a position recessed inwardly of the meter cover from an outermost circumferential portion of the side wall portion.

15. The vehicle instrument panel device according to claim 12, wherein the inclined surface is formed to have a further inclined angle so that the key cylinder which passes through the attachment hole for attachment thereto is oriented toward the screen of the instrument panel.

\* \* \* \* \*